United States Patent
Cheng et al.

(10) Patent No.: US 12,540,964 B2
(45) Date of Patent: Feb. 3, 2026

(54) DIRECT-CURRENT ELECTRIC ARC DETECTION METHOD AND APPARATUS, DEVICE, SYSTEM, AND STORAGE MEDIUM

(71) Applicant: Huawei Digital Power Technologies Co., Ltd., Shenzhen (CN)

(72) Inventors: Binjie Cheng, Shanghai (CN); Qinwei Liu, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 530 days.

(21) Appl. No.: 17/695,050

(22) Filed: Mar. 15, 2022

(65) Prior Publication Data

US 2022/0206056 A1    Jun. 30, 2022

Related U.S. Application Data

(63) Continuation of application No. PCT/CN2020/096086, filed on Jun. 15, 2020.

(30) Foreign Application Priority Data

Sep. 23, 2019    (CN) .......................... 201910900369.0

(51) Int. Cl.
*G01R 31/12*    (2020.01)
*G06N 3/045*    (2023.01)
(Continued)

(52) U.S. Cl.
CPC ......... *G01R 31/1272* (2013.01); *G06N 3/045* (2023.01); *G06N 3/08* (2013.01); *H02H 1/0015* (2013.01)

(58) Field of Classification Search
None
See application file for complete search history.

(56) References Cited

U.S. PATENT DOCUMENTS

| | | | |
|---|---|---|---|
| 7,451,012 B2 | 11/2008 | Wang et al. | |
| 2002/0118022 A1 | 8/2002 | Dring et al. | |

(Continued)

FOREIGN PATENT DOCUMENTS

| | | |
|---|---|---|
| CN | 102253293 A | 11/2011 |
| CN | 103439654 A | 12/2013 |

(Continued)

OTHER PUBLICATIONS

Ma, Shaohua, and Lina Guan. "Arc-fault recognition based on BP neural network." 2011 Third International Conference on Measuring Technology and Mechatronics Automation. vol. 1. IEEE, 2011. (Year: 2011).*

(Continued)

*Primary Examiner* — Raymond L Nimox
(74) *Attorney, Agent, or Firm* — Maier & Maier, PLLC

(57) ABSTRACT

A direct-current electric arc detection method and apparatus, a device, a system, and a storage medium. The method includes: obtaining an electrical quantity of a direct current circuit; inputting the electrical quantity into a burning arc neural network model to perform burning arc detection on the direct current circuit, to obtain a burning arc detection result; and if the burning arc detection result is that a burning arc is detected, determining that a direct-current electric arc fault exists in the direct current circuit. Because the electrical quantity is input into the burning arc neural network model to perform burning arc detection on the direct current circuit, a direct-current electric arc fault is detected, and accuracy of detecting a direct-current electric arc fault is further improved.

19 Claims, 5 Drawing Sheets

(51) Int. Cl.
*G06N 3/08* (2023.01)
*H02H 1/00* (2006.01)

(56) References Cited

U.S. PATENT DOCUMENTS

| | | | | |
|---|---|---|---|---|
| 2013/0226479 | A1* | 8/2013 | Grosjean | G01R 31/52 702/58 |
| 2014/0119072 | A1* | 5/2014 | Behrends | H01L 31/02021 363/55 |

FOREIGN PATENT DOCUMENTS

| | | | | |
|---|---|---|---|---|
| CN | 104092440 | A | | 10/2014 |
| CN | 104410360 | A | | 3/2015 |
| CN | 106199131 | A | | 12/2016 |
| CN | 107167726 | A | | 9/2017 |
| CN | 107219447 | A | | 9/2017 |
| CN | 107994866 | A | | 5/2018 |
| CN | 108107329 | A | | 6/2018 |
| CN | 108334842 | A | | 7/2018 |
| CN | 108334843 | A | | 7/2018 |
| CN | 108562835 | A | | 9/2018 |
| CN | 109061414 | A | | 12/2018 |
| CN | 109298291 | A | * 2/2019 | G01R 31/1227 |
| CN | 109975663 | A | | 7/2019 |
| CN | 110059451 | A | | 7/2019 |
| CN | 110763958 | A | | 2/2020 |
| CN | 109975663 | B | * 7/2022 | |

OTHER PUBLICATIONS

Xia, Kun, et al. "Binary classification model based on machine learning algorithm for the DC serial arc detection in electric vehicle battery system." IET Power Electronics 12.1 (2019): 112-119. (Year: 2019).*

Chen, Meng, et al. "Detection method of low voltage series dc arc based on the pattern matching algorithm." 2017 20th International Conference on Electrical Machines and Systems (ICEMS). IEEE, 2017. (Year: 2017).*

Momoh, James A., and Robbert Button. "Design and analysis of aerospace DC arcing faults using fast fourier transformation and artificial neural network." 2003 IEEE Power Engineering Society General Meeting (IEEE Cat. No. 03CH37491). vol. 2. IEEE, 2003. (Year: 2003).*

Wu et al., "Research on photovoltaic fault arc detection method based on BP neural network", Acta Energiae Solaris Sinica, vol. 17, No. 11, Nov. 2016, 7 pages (including English abstract).

Lin et al., "Study on detection method of DC arc fault in PV systems", Advanced Technology of Electrical Engineering and Energy, vol. 34, No. 12, Dec. 2015, 7 pages (including English abstract).

Xia et al., "Binary classification model based on machine learning algorithm for the DC serial arc detection in electric vehicle battery system", IET Power Electronics, IET, UK, vol. 12, No. 1, Jan. 12, 2019, 8 pages.

Jiao et al., "DC series arc-fault detection of photovoltaic system based on convolutional neural network", Advanced Technology of Electrical Engineering and Energy, vol. 38, No. 7, 6 pages (including English abstract).

Chen et al., "Detection Method of Low Voltage Series DC Arc based on the Pattern Matching Algorithm", 2017 20th International Conference on Electrical Machines and Systems (ICEMS), IEEE, Aug. 11, 2017, 4 pages.

Momoh et al., "Design and analysis of aerospace QC arcing faults using fast fourier transformation and artificial neural network", 2003 IEEE Power Engineering Society General Meeting, Conference Proceedings, Toronto, Ontario, Canada, Jul. 13-17, 2003, Ieeepower Engineering Society, New York, NY, IEEE, US, vol. 2, Jan. 1, 2003, 6 pages.

Zhou et al., "Earth science, big data mining and machine learning", Sun Yat-sen University Press, 978-7-306-06409-7, Sep. 1, 2018, with partial English translation, 17 pages.

* cited by examiner

DIRECT-CURRENT ELECTRIC ARC DETECTION METHOD AND APPARATUS, DEVICE, SYSTEM, AND STORAGE MEDIUM

CROSS-REFERENCE TO RELATED APPLICATIONS

This application is a continuation of International Application No. PCT/CN2020/096086, filed on Jun. 15, 2020, which claims priority to Chinese Patent Application No. 201910900369.0, filed on Sep. 23, 2019. The disclosures of the aforementioned applications are hereby incorporated by reference in their entireties.

TECHNICAL FIELD

The embodiments relate to the field of electric arc detection technologies, such as a direct-current electric arc detection method and apparatus, a device, a system, and a storage medium.

BACKGROUND

With support of national policies, a current photovoltaic power generation system is vigorously popularized. However, cheating in materials or improper construction in a construction process may cause some potential safety hazards. A direct-current electric arc current does not have a zero crossing point, and therefore, a direct-current electric arc is not periodically extinguished and reignited like an alternating-current electric arc. Once the direct-current electric arc is ignited, it is difficult to extinguish the direct-current electric arc. A photovoltaic cell panel continuously outputs a current to provide a stable burning environment for a fault electric arc, so that energy is unceasingly injected into the fault electric arc. Consequently, a direct-current electric arc fault causes great damage to a photovoltaic module and a transmission line and brings a risk of fire. Therefore, how to accurately detect a direct-current electric arc becomes an urgent problem to be resolved.

In a conventional technology, to detect an electric arc, an electric arc characteristic may be mined manually, and the electric arc characteristic is generalized and refined, to obtain an electric arc criterion for determining whether a direct-current electric arc exists. For example, a direct-current electric arc current waveform existing when an electric arc fault occurs and a normal current waveform existing when no electric arc fault occurs are obtained and observed. Then, the normal current waveform and the direct-current electric arc current waveform are compared to find a difference, to obtain several criteria and corresponding thresholds based on a difference characteristic (for example, if a difference between current variances at a previous moment and a current moment is greater than a threshold K, it is determined that an electric arc is generated). Finally, whether a direct-current electric arc is generated is detected in real time based on the criterion and threshold in a photovoltaic power generation system, to determine whether there is a direct-current electric arc.

However, in the prior art, accuracy of detecting a direct-current electric arc in real time by manually searching for an electric arc characteristic and a non-electric arc characteristic is comparatively low.

SUMMARY

Embodiments provide a direct-current electric arc detection method and apparatus, a device, a system, and a storage medium, to detect a direct-current electric arc fault, and improve accuracy of detecting a direct-current electric arc fault.

According to a first aspect, a direct-current electric arc detection method may include:

obtaining an electrical quantity of a direct current circuit; inputting the electrical quantity into a burning arc neural network model to perform burning arc detection on the direct current circuit, to obtain a burning arc detection result; and if the burning arc detection result is that a burning arc is detected, determining that a direct-current electric arc fault exists in the direct current circuit.

An electric arc is an instantaneous spark generated when a current passes through an insulating medium. The electric arc may be divided into a starting arc and a burning arc. The starting arc indicates ignition of the electric arc. The burning arc is an electric arc generated after the starting arc. In addition, the electric arc may further include a blowing-out arc. The blowing-out arc indicates blowing out of the electric arc. The burning arc may alternatively be an electric arc between the starting arc and the blowing-out arc. Burning arc detection is used to detect whether a burning arc exists. Starting arc detection is used to detect whether a starting arc exists. In this embodiment, the electrical quantity is input into the burning arc neural network model to perform burning arc detection on the direct current circuit, to detect a direct-current electric arc fault, and improve accuracy of detecting a direct-current electric arc fault.

Optionally, the electrical quantity is data obtained by performing Fourier transform and data per unit normalization processing on an original electrical quantity.

Per unit normalization processing is used to calculate a ratio between the original electrical quantity and a base value. A per unit normalization is a value denotation method commonly used in power system analysis and engineering calculation. Per unit values represent relative values of physical quantities and parameters. A process of calculating a per unit value is per unit normalization processing. In this embodiment, a Fourier transform and data per unit normalization are performed on the original electrical quantity, to help to improve accuracy of a starting arc neural network model and the burning arc neural network model.

Optionally, before the inputting the electrical quantity into a burning arc neural network model, the direct-current electric arc detection method provided in this embodiment further includes:

inputting the electrical quantity into a starting arc neural network model to perform starting arc detection on the direct current circuit, to obtain a starting arc detection result; and if the starting arc detection result is that a starting arc is detected, inputting the electrical quantity into the burning arc neural network model.

In this embodiment, the electrical quantity is input into the starting arc neural network model to perform starting arc detection on the direct current circuit, thereby effectively reducing an electric arc misidentification rate. Then, after a starting arc is detected, the electrical quantity is input into the burning arc neural network model to perform burning arc detection on the direct current circuit, to detect a direct-current electric arc fault, and further improve accuracy of detecting a direct-current electric arc fault.

Optionally, the starting arc neural network model is a neural network model obtained through training based on first training data, and the first training data includes starting arc training data and non-burning arc training data.

In this embodiment, the starting arc neural network model is trained based on the starting arc training data and the non-burning arc training data, to improve accuracy of the starting arc neural network model.

Optionally, the burning arc neural network model is a neural network model obtained through training based on second training data, and the second training data includes burning arc training data and the non-burning arc training data. In this embodiment, the burning arc neural network model is trained based on the burning arc training data and the non-burning arc training data, to improve accuracy of the burning arc neural network model.

Optionally, the starting arc detection result is a fractional value indicating existence of a starting arc in the direct current circuit, and the direct-current electric arc detection method provided in this embodiment includes:
if the starting arc detection result is greater than a first threshold, determining that the starting arc detection result is that a starting arc is detected.

In this embodiment, the threshold is set, and when an output result of the starting arc neural network model is greater than the threshold, it is determined that a starting arc is detected. In this way, accuracy of determining a starting arc is improved, and accuracy of detecting a direct-current electric arc fault is further improved.

Optionally, the direct-current electric arc detection method provided in this embodiment further includes:
if the starting arc detection result is less than or equal to a first threshold, continuing to input the electrical quantity into the starting arc neural network model until it is determined that a starting arc exists in the direct current circuit.

In this embodiment, when an output result of the starting arc neural network model is less than or equal to the first threshold, in other words, when no starting arc is detected, the electrical quantity continues to be input into the starting arc neural network model to perform starting arc detection, until it is determined whether a direct-current electric arc fault exists in the direct current circuit. In this way, a starting arc is detected.

Optionally, the burning arc detection result is a fractional value indicating existence of a burning arc in the direct current circuit, and the direct-current electric arc detection method provided in this embodiment includes:
if the burning arc detection result is greater than a second threshold, determining that the burning arc detection result is that a burning arc is detected.

In this embodiment, a burning arc is determined. The second threshold is set, and if an output result of the burning arc neural network model is greater than the second threshold, it is determined that a burning arc is detected. In this way, accuracy of determining a burning arc is improved, and accuracy of determining a direct-current electric arc fault is further improved.

Optionally, the direct-current electric arc detection method provided in this embodiment further includes:
if the burning arc detection result is less than or equal to a second threshold, determining whether duration from a time at which no starting arc is detected to a current time is less than preset duration; and if the duration is less than the preset duration, continuing to use the electrical quantity as an input parameter of the burning arc neural network model until it is determined whether a direct-current electric arc fault exists in the direct current circuit; or if the duration is greater than or equal to the preset duration, continuing to use the electrical quantity as an input parameter of the starting arc neural network model until it is determined that a starting arc exists in the direct current circuit.

The preset duration is set, and if a burning arc is detected within the preset duration after a starting arc is detected, it is determined that a direct-current electric arc fault occurs. In this way, accuracy of detecting a direct-current electric arc fault is improved.

Optionally, after the determining that a direct-current electric arc fault exists in the direct current circuit, the method further includes:
pushing alarm information to notify a user that a direct-current electric arc fault exists in the direct current circuit.

In this embodiment, the alarm information is pushed to notify the user that a direct-current electric arc fault exists in the direct current circuit, so that the user takes a corresponding measure to avoid a disaster.

Optionally, the direct-current electric arc detection method provided in this embodiment further includes:
determining whether a direct-current electric arc fault result is accurate; and if the direct-current electric arc fault determining result is inaccurate, updating the starting arc neural network model and the burning arc neural network model based on the electrical quantity.

In this embodiment, the starting arc neural network model and the burning arc neural network model are updated, to improve reliability of a starting arc neural network and a burning arc neural network model.

The following describes a direct-current electric arc detection apparatus, a device, a system, a storage medium, and a computer program product that are provided in the embodiments. For content and effects thereof, refer to the direct-current electric arc detection method according to any one of the first aspect or optional manners of the first aspect of the embodiments. Details are not described again.

According to a second aspect, an embodiment may provide a direct-current electric arc detection apparatus, including:
an obtaining module, configured to obtain an electrical quantity of a direct current circuit; and a first processing module, configured to input the electrical quantity into a burning arc neural network model to perform burning arc detection on the direct current circuit, to obtain a burning arc detection result, where the first processing module is further configured to: if the burning arc detection result is that a burning arc is detected, determine that a direct-current electric arc fault exists in the direct current circuit.

Optionally, the electrical quantity is data obtained by performing Fourier transform and data per unit normalization processing on an original electrical quantity.

Optionally, the direct-current electric arc detection apparatus provided in this embodiment further includes:
a second processing module, configured to input the electrical quantity into a starting arc neural network model to perform starting arc detection on the direct current circuit, to obtain a starting arc detection result, where the second processing module is further configured to: if the starting arc detection result is that a starting arc is detected, input the electrical quantity into the burning arc neural network model.

Optionally, the starting arc neural network model is a neural network model obtained through training based on first training data, and the first training data includes starting arc training data and non-burning arc training data.

Optionally, the burning arc neural network model is a neural network model obtained through training based on second training data, and the second training data includes burning arc training data and the non-burning arc training data.

Optionally, in the direct-current electric arc detection apparatus provided in this embodiment, the starting arc detection result is a fractional value indicating existence of a starting arc in the direct current circuit, and the second processing module is configured to:

if the starting arc detection result is greater than a first threshold, determine that the starting arc detection result is that a starting arc is detected.

Optionally, in the direct-current electric arc detection apparatus provided in this embodiment, the second processing module is further configured to:

if the starting arc detection result is less than or equal to a first threshold, continue to input the electrical quantity into the starting arc neural network model until it is determined that a starting arc exists in the direct current circuit.

Optionally, in the direct-current electric arc detection apparatus provided in this embodiment, the burning arc detection result is a fractional value indicating existence of a burning arc in the direct current circuit, and the first processing module is configured to:

if the burning arc detection result is greater than a second threshold, determine that the burning arc detection result is that a burning arc is detected.

Optionally, in the direct-current electric arc detection apparatus provided in this embodiment, the first processing module is configured to:

if the burning arc detection result is less than or equal to a second threshold, determine whether duration from a time at which a starting arc is detected to a current time is less than preset duration; and if the duration is less than the preset duration, continue to input the electrical quantity into the burning arc neural network model until it is determined whether a direct-current electric arc fault exists in the direct current circuit.

Optionally, the direct-current electric arc detection apparatus provided in this embodiment further includes:

a pushing module, configured to push alarm information to notify a user that a direct-current electric arc fault exists in the direct current circuit.

Optionally, the direct-current electric arc detection apparatus provided in this embodiment further includes:

a determining module, configured to determine whether a direct-current electric arc fault result is accurate; and an updating module, configured to: if the direct-current electric arc fault determining result is inaccurate, update the starting arc neural network model and the burning arc neural network model based on the electrical quantity.

According to a third aspect, an embodiment provides a device, including a processor and a transmission interface.

The transmission interface is configured to obtain an electrical quantity of a direct current circuit. The processor is configured to: input the electrical quantity into a burning arc neural network model to perform burning arc detection on the direct current circuit, to obtain a burning arc detection result; and if the burning arc detection result is that a burning arc is detected, determine that a direct-current electric arc fault exists in the direct current circuit.

Optionally, the electrical quantity is data obtained by performing Fourier transform and data per unit normalization processing on an original electrical quantity.

Optionally, the processor is further configured to: input the electrical quantity into a starting arc neural network model to perform starting arc detection on the direct current circuit, to obtain a starting arc detection result; and if the starting arc detection result is that a starting arc is detected, input the electrical quantity into the burning arc neural network model.

Optionally, the starting arc neural network model is a neural network model obtained through training based on first training data, and the first training data includes starting arc training data and non-burning arc training data.

Optionally, the burning arc neural network model is a neural network model obtained through training based on second training data, and the second training data includes burning arc training data and the non-burning arc training data.

Optionally, the starting arc detection result is a fractional value indicating existence of a starting arc in the direct current circuit, and the processor is configured to:

if the starting arc detection result is greater than a first threshold, determine that the starting arc detection result is that a starting arc is detected.

Optionally, the processor is further configured to: if the starting arc detection result is less than or equal to a first threshold, continue to input the electrical quantity into the starting arc neural network model until it is determined that a starting arc exists in the direct current circuit.

Optionally, the burning arc detection result is a fractional value indicating existence of a burning arc in the direct current circuit, and the processor is further configured to:

if the burning arc detection result is greater than a second threshold, determine that the burning arc detection result is that a burning arc is detected.

Optionally, the processor is further configured to:

if the burning arc detection result is less than or equal to a second threshold, determine whether duration from a time at which a starting arc is detected to a current time is less than preset duration; and if the duration is less than the preset duration, continue to input the electrical quantity into the burning arc neural network model until it is determined whether a direct-current electric arc fault exists in the direct current circuit.

Optionally, the processor is further configured to push alarm information to notify a user that a direct-current electric arc fault exists in the direct current circuit.

Optionally, the processor is further configured to: determine whether a direct-current electric arc fault result is accurate; and if the direct-current electric arc fault determining result is inaccurate, update the starting arc neural network model and the burning arc neural network model based on the electrical quantity.

According to a fourth aspect, an embodiment provides a system, including a sensor and the device according to any one of the third aspect or optional manners of the third aspect. The sensor is configured to collect an electrical quantity of a direct current circuit.

According to a fifth aspect, an embodiment provides a computer-readable storage medium. The computer-readable storage medium stores instructions. When the instructions are run on a computer or a processor, the computer or the processor is enabled to perform the method according to any one of the first aspect or optional manners of the first aspect.

According to a sixth aspect, an embodiment provides a computer program product including instructions. When the computer program product is run on a computer or a processor, the computer or the processor is enabled to perform the method according to any one of the first aspect or optional manners of the first aspect.

According to the direct-current electric arc detection method and apparatus, the device, the system, and the storage medium that are provided in the embodiments, the electrical quantity of the direct current circuit is obtained; the electrical quantity is input into the burning arc neural network model to perform burning arc detection on the direct current circuit, to obtain the burning arc detection result; and if the burning arc detection result is that a burning arc is detected, it is determined that a direct-current electric arc fault exists in the direct current circuit. Because the electrical quantity is input into the burning arc neural network model to perform burning arc detection on the direct current circuit, a direct-current electric arc fault is detected, and accuracy of detecting a direct-current electric arc fault is further improved.

DETAILED DESCRIPTION OF THE EMBODIMENTS

It should be understood that, although terms such as "first", "second", "third", and "fourth" may be used in embodiments to describe training data, these pieces of training data should not be limited to these terms. These terms are merely used to distinguish between the pieces of training data. For example, without departing from the scope of the embodiments, first training data may be alternatively referred to as second training data, and similarly, second training data may be alternatively referred to as first training data.

With support of national policies, a current photovoltaic power generation system is vigorously popularized. However, cheating in materials or improper construction in a construction process may cause some potential safety hazards. A direct-current electric arc current does not have a zero crossing point, and therefore, a direct-current electric arc is not periodically extinguished and reignited like an alternating-current electric arc. Once the direct-current electric arc is ignited, it is difficult to extinguish the direct-current electric arc. A photovoltaic cell panel continuously outputs a current to provide a stable ignition environment for a fault electric arc, so that energy is unceasingly injected into the fault electric arc. Consequently, a direct-current electric arc fault causes great damage to a photovoltaic module and a transmission line and brings a risk of fire. Therefore, how to accurately detect a direct-current electric arc becomes an urgent problem to be resolved. However, in the prior art, accuracy of detecting a direct-current electric arc in real time by manually searching for an electric arc characteristic and a non-electric arc characteristic is comparatively low. To resolve the foregoing problem, the embodiments may provide a direct-current electric arc detection method and apparatus, a device, a system, and a storage medium.

Figure 1:
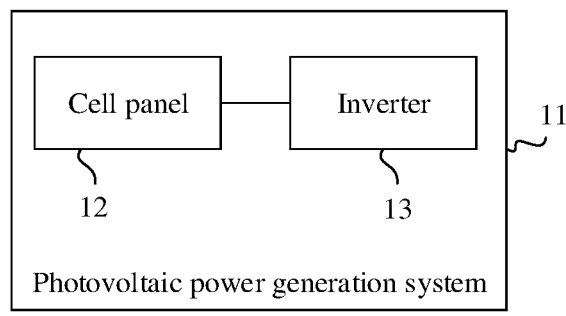
FIG. 1 is a diagram of an example application scenario of embodiments.

FIG. 1 is a diagram of an exemplary embodiment. As shown in FIG. 1, the embodiments may be applied to a photovoltaic power generation system 11. The photovoltaic power generation system 11 may include a cell panel 12 and an inverter 13. The cell panel 12 is configured to convert solar energy to electric energy. The inverter 13 is configured to convert, to an alternating current, a direct current transmitted by the cell panel 12. A large quantity of photovoltaic strings may be connected on a direct current side of the photovoltaic power generation system. The photovoltaic strings are dispersed in space, there are a large quantity of connectors for connecting photovoltaic modules, and a direct-current-side cable is long. Therefore, detection of a direct-current electric arc fault becomes an important issue for the photovoltaic power generation system. Causes of an electric arc include poor line contact and line insulation aging. Poor line contact may occur at a line junction. If a joint is not properly connected at the junction, flow of a current in a conducting wire is impeded, which easily results in line heating and a fault electric arc. When a line insulation level is reduced, a power supply line is prone to an insulation breakdown, thereby causing an electric-arc short circuit. When line insulation is damaged, an insulator between cable cores or between a cable core and a lead sheath is broken down, and an electric arc is generated, thereby burning a jute protective layer of a cable insulation material. Therefore, in addition to the photovoltaic power generation system, the direct-current electric arc detection method provided in the embodiments may be used for, for example, another circuit and scenario in which a direct-current electric arc may be generated, for example, the electric vehicle field and the aerospace field. Based on this, the embodiments may provide the direct-current electric arc detection method and apparatus, the device, the system, and the storage medium.

Figure 2:
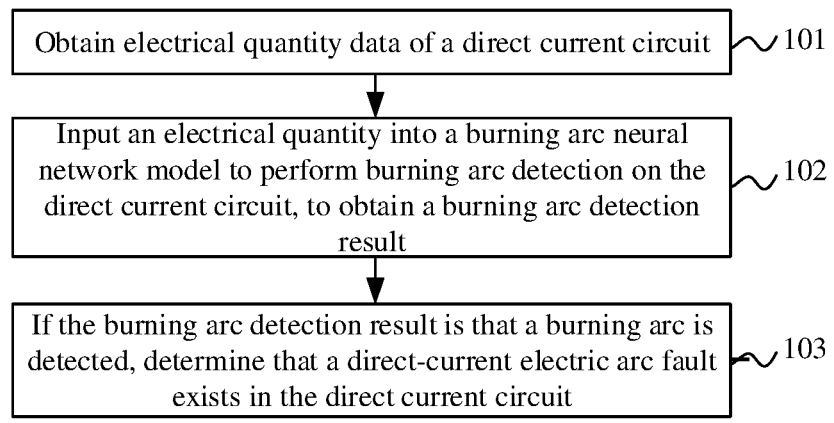
FIG. 2 is a schematic flowchart of a direct-current electric arc detection method according to an embodiment.

FIG. 2 is a schematic flowchart of a direct-current electric arc detection method according to an embodiment. The method may be performed by a direct-current electric arc detection apparatus provided in an embodiment. The apparatus may be implemented by using software and/or hardware. For example, the direct-current electric arc detection apparatus may be a part or an entirety of a terminal device, for example, may be a processor in the terminal device. The direct-current electric arc detection method provided in this embodiment is described below by using an example in which the method is performed by the terminal device. As shown in FIG. 2, the direct-current electric arc detection method provided in this embodiment may include the following steps.

Step S101: Obtain an electrical quantity of a direct current circuit.

The electrical quantity of the direct current circuit may be obtained by using a sensor in the terminal device, or the electrical quantity may be obtained from a sensor through a transmission interface of a processor. A manner of obtaining the electrical quantity is not limited in this embodiment. The electrical quantity may be, for example, current data of the direct current circuit, voltage data of the direct current circuit, or current data and voltage data. A data type of the electrical quantity is not limited in this embodiment.

A form of the electrical quantity is not limited in this embodiment. A direct-current electric arc has an obvious characteristic in a current spectrum. Therefore, in a possible implementation, the electrical quantity is data obtained through Fourier transform and data per unit normalization processing.

Using the current spectrum as an input into a neural network model facilitates training and running of the model and can improve a generalization capability of the model. In addition, per unit normalization is a value denotation method commonly used in power system analysis and engineering calculation. Per unit values represent relative values of physical quantities and parameters. A per unit value is relative to a base value. A same actual value corresponds to different per unit values when different base values are selected. A relationship among the per unit value, the base value, and the actual value is as follows: Per unit value=Actual value/Base value. Fourier transform and data per unit normalization processing are performed on the electrical quantity, to improve reliability of the electrical quantity.

Step S102: Input the electrical quantity into a burning arc neural network model to perform burning arc detection on the direct current circuit, to obtain a burning arc detection result.

In this embodiment, a model parameter of the burning arc neural network model is not limited, provided that burning arc detection can be performed on the direct current circuit. In a possible implementation, a convolutional neural network may be selected for the burning arc neural network model. The convolutional neural network can be used to more deeply mine an electric arc characteristic, for example, an edge characteristic between input data, and therefore has a comparatively strong capability of distinguishing between a burning arc and a non-burning arc. In addition, the convolutional neural network implements parameter sharing, thereby effectively reducing a quantity of network parameters.

Optionally, the burning arc neural network model is a neural network model obtained through training based on second training data, and the second training data includes burning arc training data and non-burning arc training data. To input the electrical quantity into the burning arc neural network model to perform burning arc detection on the direct current circuit, in a possible implementation, before the inputting the electrical quantity into a burning arc neural network model to perform burning arc detection on the direct current circuit, the direct-current electric arc detection method provided in this embodiment may further include:

obtaining the second training data corresponding to the burning arc neural network model, where the second training data includes the burning arc training data and the non-burning arc training data; and training the burning arc neural network model based on the second training data.

The second training data corresponding to the burning arc neural network model may be obtained by collecting a historical electrical quantity of the direct current circuit. A quantity of samples of the second training data is not limited in this embodiment. The second training data includes the burning arc training data and the non-burning arc training data. Whether data is the burning arc training data or the non-burning arc training data may be determined based on a stage in which the electric arc occurs at a moment at which the data is collected or may be determined based on a change extent of the electrical quantity, or the like.

An implementation of training the burning arc neural network model based on the second training data is not limited in this embodiment. For example, the burning arc training data may be used as a positive sample and denoted by 1, and the non-burning arc training data may be used as a negative sample and denoted by 0, to train the burning arc neural network model, so that the burning arc neural network model can effectively identify a burning arc. In a training process, the second training data may be divided into groups in proportion, for example, divided into a training set, a test set, and a development set. Group types and group proportions of the second training data are not limited in this embodiment. The burning arc neural network model is trained by using the training set, and the burning arc neural network model is tested and verified by using the development set or the test set. In a possible implementation, if accuracy of burning arc detection based on the development set and the test set reaches a specified threshold, training of the burning arc neural network model is ended; if accuracy of burning arc detection based on the development set and the test set does not reach a specified threshold, the burning arc neural network model is adjusted, and continues to be trained. In this embodiment, the burning arc neural network model may be trained based on the burning arc training data and the non-burning arc training data, to improve accuracy of the burning arc neural network model.

An implementation of inputting the electrical quantity into the burning arc neural network model to perform burning arc detection on the direct current circuit is not limited in this embodiment. For example, whether a burning arc is detected may be directly determined based on an output result of the burning arc neural network model, or whether a burning arc is detected is further inferred based on an output result of the burning arc neural network model.

Step S103: If the burning arc detection result is that a burning arc is detected, determine that a direct-current electric arc fault exists in the direct current circuit.

If the burning arc detection result is that a burning arc is detected, it is determined that a direct-current electric arc fault exists in the direct current circuit. If the burning arc detection result is that no burning arc is detected, it is determined that no direct-current electric arc fault exists in the direct current circuit. A subsequent operation performed after it is determined that a direct-current electric arc fault exists in the direct current circuit is not limited in this embodiment. In a possible implementation, after step S103, the method further includes:

pushing alarm information to notify a user that a direct-current electric arc fault exists in the direct current circuit.

The alarm information may be pushed in a form of voice, an indicator, text information, or the like. In this embodiment, a manner of pushing the alarm information is not limited, provided that the user can be notified that a direct-current electric arc fault exists in the direct current circuit. The alarm information is pushed to notify the user that a direct-current electric arc fault exists in the direct current circuit, so that the user takes a corresponding measure to avoid a disaster.

In this embodiment, the electrical quantity is input into a starting arc neural network model to perform starting arc detection on the direct current circuit, thereby effectively reducing an electric arc misidentification rate. Then, after a starting arc is detected, the electrical quantity is input into the burning arc neural network model to perform burning arc detection on the direct current circuit. According to the direct-current electric arc detection method performed by stages, whether an electric arc exists is preliminarily determined based on a start characteristic of the electric arc, and then determining is performed for the second time by using the burning arc neural network model, to effectively improve an immunity to interference from noise, reduce an error trigger rate, and improve identification accuracy.

Figure 3:
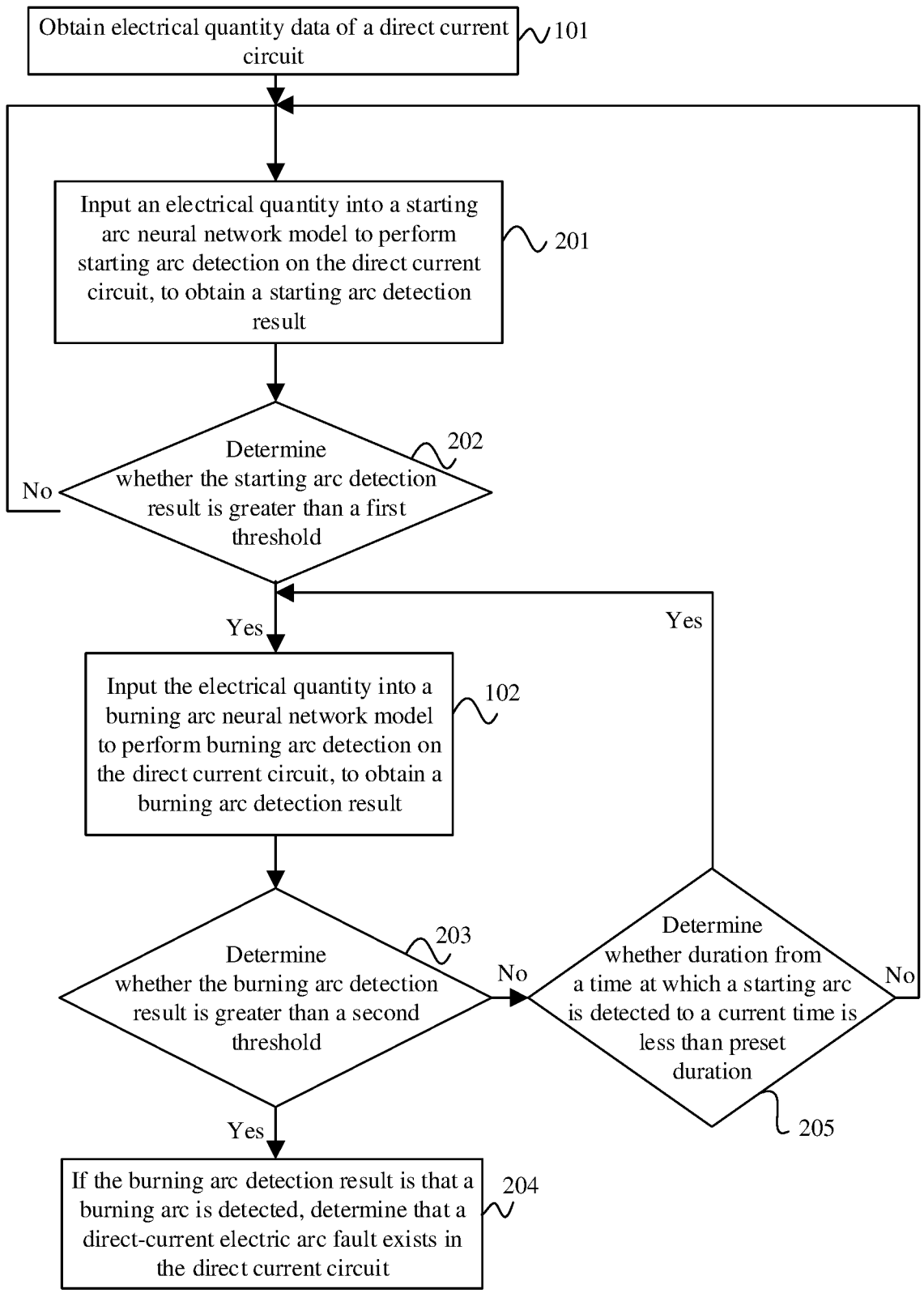
FIG. 3 is a schematic flowchart of a direct-current electric arc detection method according to another embodiment.

To reduce the electric arc misidentification rate, in a possible implementation, FIG. 3 is a schematic flowchart of a direct-current electric arc detection method according to another embodiment. The method may be performed by a direct-current electric arc detection apparatus provided in an embodiment. The apparatus may be implemented by using software and/or hardware. For example, the direct-current electric arc detection apparatus may be a part or an entirety of a terminal device, for example, may be a processor in the terminal device. The direct-current electric arc detection method provided in this embodiment is described below by using an example in which the method is performed by the terminal device. As shown in FIG. 3, after step S101, the direct-current electric arc detection method provided in this embodiment may include the following step:

Step S201: Input the electrical quantity into the starting arc neural network model to perform starting arc detection on the direct current circuit, to obtain a starting arc detection result.

The electrical quantity is input into the starting arc neural network model to perform starting arc detection on the direct current circuit. In this embodiment, a model parameter of the starting arc neural network model is not limited, provided that starting arc detection can be performed on the direct current circuit. In a possible implementation, the starting arc neural network model may be a multilayer perceptron. The multilayer perceptron has a plurality of neuron layers, and therefore, is also referred to as a deep neural network. The multilayer perceptron has a small calculation amount and can effectively reduce load on a processor. In another possible implementation, the starting arc neural network model is a neural network model obtained through training based on first training data, and the first training data includes the starting arc training data and the non-burning arc training data.

To input the electrical quantity into the starting arc neural network model to perform starting arc detection on the direct current circuit, in a possible implementation, before the inputting the electrical quantity into the starting arc neural network model to perform starting arc detection on the direct current circuit, the direct-current electric arc detection method provided in this embodiment may further include:

obtaining the first training data corresponding to the starting arc neural network model, where the first training data includes the starting arc training data and the non-burning arc training data; and training the starting arc neural network model based on the first training data.

The first training data corresponding to the starting arc neural network model may be obtained by collecting the historical electrical quantity of the direct current circuit. A quantity of samples of the first training data is not limited in this embodiment. The first training data includes the starting arc training data and the non-burning arc training data. Whether data is the starting arc training data or the non-burning arc training data may be determined based on a stage in which the electric arc occurs at a moment at which the data is collected or may be determined based on a change extent of the electrical quantity, or the like.

An implementation of training the starting arc neural network model based on the first training data is not limited in this embodiment. For example, the starting arc training data may be used as a positive sample and denoted by 1, and the non-burning arc training data may be used as a negative sample and denoted by 0, to train the starting arc neural network model, so that the starting arc neural network model can effectively identify a starting arc. In a training process, the first training data may be divided into groups in proportion, for example, divided into a training set, a test set, and a development set. Group types and group proportions of the first training data are not limited in this embodiment. The starting arc neural network model is trained by using the training set, and the starting arc neural network model is tested and verified by using the development set or the test set. In a possible implementation, if accuracy of starting arc detection based on the development set and the test set reaches a specified threshold, training of the starting arc neural network model is ended; if accuracy of starting arc detection based on the development set and the test set does not reach a specified threshold, the starting arc neural network model is adjusted, and continues to be trained. In this embodiment, the starting arc neural network model may be trained based on the starting arc training data and the non-burning arc training data, to improve accuracy of the starting arc neural network model.

If the starting arc detection result is that a starting arc is detected, the electrical quantity is input into the burning arc neural network model to perform burning arc detection on the direct current circuit. If the starting arc detection result is that no starting arc is detected, step S101 may be performed again. The electrical quantity is used as an input parameter of the starting arc neural network model to obtain an output result of a starting arc neural network model. A form of the output result of the starting arc neural network is not limited in this embodiment. In a possible implementation, the output result may be a starting arc probability. For example, the output result may be in a form of a percentage, a fractional value, or type of a starting arc. In a possible implementation, the starting arc detection result is a fractional value indicating existence of a starting arc in the direct current circuit. For example, if the starting arc detection result is 0, it indicates that no starting arc exists in the direct current circuit; if the starting arc detection result is 100, it indicates that a starting arc definitely exists in the direct current circuit.

Optionally, after step S201, as shown in FIG. 3, the direct-current electric arc detection method provided in this embodiment may further include the following step:

Step S202: Determine whether the starting arc detection result is greater than a first threshold.

A setting form of the first threshold may be set based on a form of the output result. For example, if the output result is a percentage of a starting arc, the first threshold may be set in a form of a percentage. In addition, a value of the first threshold is not limited in this embodiment and may be adjusted based on a user requirement. After the first threshold and the output result of the starting arc neural network model are determined, whether the output result of the starting arc neural network model is greater than the first threshold is determined.

If it is determined that the output result of the starting arc neural network model is less than or equal to the first preset threshold, it indicates that no starting arc is detected. In this case, step S201 is performed, so that the electrical quantity continues to be input into the starting arc neural network model, to determine whether a starting arc exists. When the starting arc detection result is less than or equal to the first threshold, in other words, when no starting arc is detected, the electrical quantity continues to be input into the starting arc neural network model, to detect a starting arc.

If it is determined that the output result of the starting arc neural network model is greater than the first threshold, it is determined that a starting arc is detected, and step S102 is performed. The threshold is set, and when the output result of the starting arc neural network model is greater than the threshold, it is determined that a starting arc is detected. In this way, accuracy of determining a starting arc is improved, and accuracy of detecting a direct-current electric arc fault is further improved.

In step S102, the electrical quantity is input into the burning arc neural network model to perform burning arc detection on the direct current circuit, to obtain the burning arc detection result. The electrical quantity is used as an input parameter of the burning arc neural network model to obtain an output result of a burning arc neural network model. A form of the output result of the burning arc neural network is not limited in this embodiment. In a possible implementation, the output result may be a burning arc probability. For example, the output result may be in a form of a percentage, score, or type of a burning arc.

After step S102, as shown in FIG. 3, the direct-current electric arc detection method provided in this embodiment may further include the following step:

Step S203: Determine whether the burning arc detection result is greater than a second threshold.

A setting form of the second threshold may be set based on a form of the output result. For example, if the output result is a percentage of a burning arc, the second threshold may be set in a form of a percentage. In addition, a value of the second threshold is not limited in this embodiment and may be adjusted based on a user requirement. After the second threshold and the output result of the burning arc neural network model are determined, whether the output result of the burning arc neural network model is greater than the second threshold is determined.

If it is determined that the output result of the burning arc neural network model is greater than the second threshold, step S204 is performed.

Step S204: when the burning arc detection result is that a burning arc is detected, determine that a direct-current electric arc fault exists in the direct current circuit.

The second threshold is set, and if the output result of the burning arc neural network model is greater than the second threshold, it is determined that a burning arc is detected. In this way, accuracy of determining a burning arc is improved, and accuracy of determining a direct-current electric arc fault is further improved.

If it is determined that the output result of the burning arc neural network model is less than or equal to the second threshold, step S205 is performed.

Step S205: Determine whether duration from a time at which a starting arc is detected to a current time is less than preset duration.

A value of the preset duration is not limited in this embodiment and may be set based on a user requirement. In a possible implementation, the preset duration is 2 minutes. In this embodiment, a manner of obtaining the duration from the time at which a starting arc is detected to the current time is not limited, provided that the duration can be obtained.

If it is determined that the duration is less than the preset duration, step S102 is performed again, so that the electrical quantity continues to be input into the burning arc neural network model, to determine whether a burning arc exists within the preset duration after a starting arc is detected, thereby detecting a direct-current electric arc fault. If the duration is greater than or equal to the preset duration, step S201 is performed again, so that the electrical quantity continues to be input into the starting arc neural network model.

In this embodiment, the preset duration is set, so that if a burning arc is detected within the preset duration after a starting arc is detected, it is determined that a direct-current electric arc fault occurs. In this way, accuracy of detecting a direct-current electric arc fault is improved.

Figure 4:
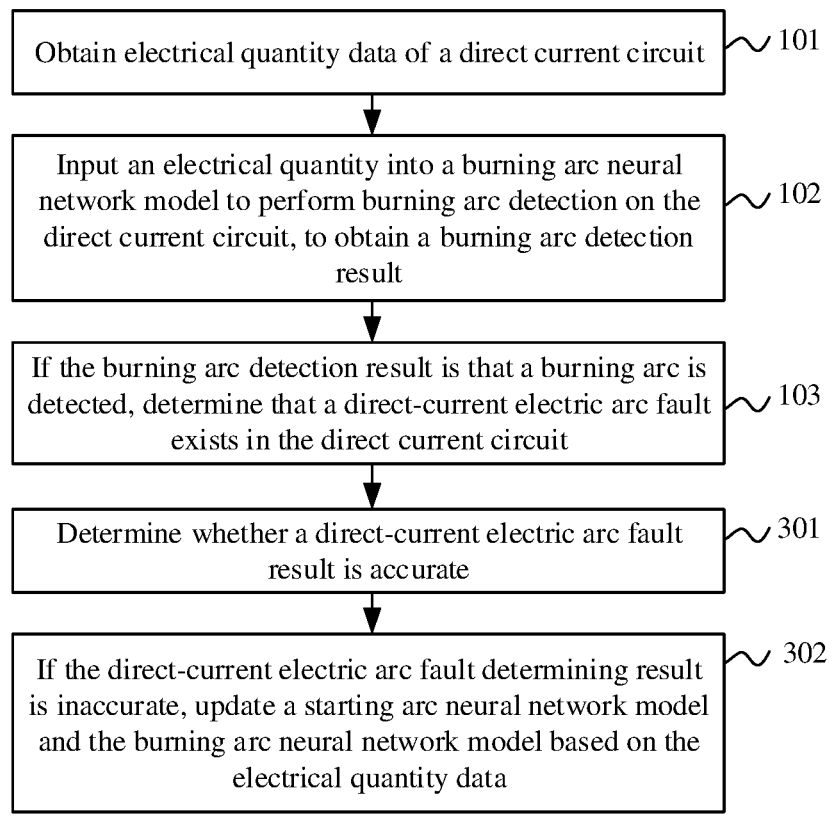
FIG. 4 is a schematic flowchart of a direct-current electric arc detection method according to still another embodiment.

To improve reliability of a starting arc neural network and a burning arc neural network, in a possible implementation, FIG. 4 is a schematic flowchart of a direct-current electric arc detection method according to still another embodiment. The method may be performed by a direct-current electric arc detection apparatus provided in an embodiment. The apparatus may be implemented by using software and/or hardware. For example, the direct-current electric arc detection apparatus may be a part or an entirety of a terminal device, for example, may be a processor in the terminal device. The direct-current electric arc detection method provided in this embodiment is described below by using an example in which the method is performed by the terminal device. As shown in FIG. 4, the direct-current electric arc detection method provided in this embodiment may further include the following steps:

Step S301: Determine whether a direct-current electric arc fault result is accurate.

In a process of determining a direct-current electric arc fault, a case of erroneous determining may occur. To improve accuracy of detecting the direct-current electric arc, whether a direct-current electric arc fault result is accurate may be determined, to obtain accuracy of determining the direct-current electric arc.

Step S302: If the direct-current electric arc fault determining result is inaccurate, update the starting arc neural network model and the burning arc neural network model based on the electrical quantity.

If the direct-current electric arc fault determining result is inaccurate, data based on which a direct-current electric arc fault is inaccurately determined may be extracted, and the data is used as a sample to train the starting arc neural network model and the burning arc neural network model respectively in manners used for the starting arc neural network model and the burning arc neural network model in the foregoing embodiments, so as to update the starting arc neural network model and the burning arc neural network model, thereby improving reliability of the starting arc neural network and the burning arc neural network.

To extract the data based on which a direct-current electric arc fault is inaccurately determined, data within a period of time may be obtained, and the data within the period of time is used to train the starting arc neural network model and the burning arc neural network model separately. Frequency of updating the starting arc neural network model and the burning arc neural network model is not limited in this embodiment and may be set based on an actual requirement. For example, data based on which a direct-current electric arc fault is inaccurately determined in each natural month is collected to train the starting arc neural network model and the burning arc neural network model, so that the starting arc neural network model and the burning arc neural network model are updated in each natural month.

In this embodiment, the starting arc neural network model and the burning arc neural network model are updated, thereby improving reliability of the starting arc neural network and the burning arc neural network.

The following describes a direct-current electric arc detection apparatus, a device, a system, a storage medium, and a computer program product that are provided in the embodiments. For content and effects thereof, refer to the direct-current electric arc detection method provided in the embodiments. Details are not described again.

Figure 5:
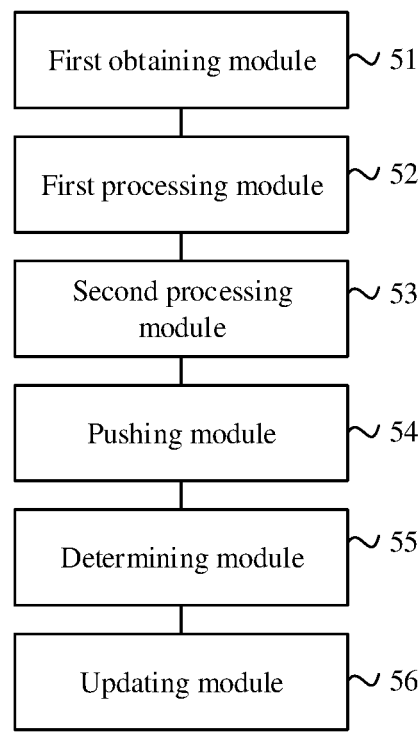
FIG. 5 is a schematic structural diagram of a direct-current electric arc detection apparatus according to an embodiment.

The embodiments may provide a direct-current electric arc detection apparatus. FIG. 5 is a schematic structural diagram of a direct-current electric arc detection apparatus according to an embodiment. The apparatus may be implemented by using software and/or hardware. For example, the direct-current electric arc detection apparatus may be a part or an entirety of a terminal device, for example, may be a processor in the terminal device. As shown in FIG. 5, the direct-current electric arc detection apparatus provided in this embodiment may further include:

an obtaining module 51, configured to obtain an electrical quantity of a direct current circuit; and a first processing module 52, configured to input the electrical quantity into a burning arc neural network model to perform burning arc detection on the direct current circuit, to obtain a burning arc detection result, where the first processing module 52 is further configured to: if the burning arc detection result is that a burning arc is detected, determine that a direct-current electric arc fault exists in the direct current circuit.

Optionally, the electrical quantity is data obtained by performing Fourier transform and data per unit normalization processing on an original electrical quantity.

Optionally, the direct-current electric arc detection apparatus provided in this embodiment further includes:

a second processing module 53, configured to input the electrical quantity into a starting arc neural network model to perform starting arc detection on the direct current circuit, to obtain a starting arc detection result, where the second processing module 53 is further configured to: if the starting arc detection result is that a starting arc is detected, input the electrical quantity into the burning arc neural network model.

Optionally, the starting arc neural network model is a neural network model obtained through training based on first training data, and the first training data includes starting arc training data and non-burning arc training data.

Optionally, the burning arc neural network model is a neural network model obtained through training based on second training data, and the second training data includes burning arc training data and the non-burning arc training data.

Optionally, in the direct-current electric arc detection apparatus provided in this embodiment, the starting arc detection result is a fractional value indicating existence of a starting arc in the direct current circuit, and the second processing module 53 is configured to:

if the starting arc detection result is greater than a first threshold, determine that the starting arc detection result is that a starting arc is detected.

Optionally, in the direct-current electric arc detection apparatus provided in this embodiment, the second processing module 53 is further configured to:

if the starting arc detection result is less than or equal to a first threshold, continue to input the electrical quantity into the starting arc neural network model until it is determined that a starting arc exists in the direct current circuit.

Optionally, in the direct-current electric arc detection apparatus provided in this embodiment, the burning arc detection result is a fractional value indicating existence of a burning arc in the direct current circuit, and the first processing module 52 is configured to:

if the burning arc detection result is greater than a second threshold, determine that the burning arc detection result is that a burning arc is detected.

Optionally, in the direct-current electric arc detection apparatus provided in this embodiment, the first processing module 52 is configured to:

if the burning arc detection result is less than or equal to a second threshold, determine whether duration from a time at which a starting arc is detected to a current time is less than preset duration; and if the duration is less than the preset duration, continue to input the electrical quantity into the burning arc neural network model until it is determined whether a direct-current electric arc fault exists in the direct current circuit.

Optionally, the direct-current electric arc detection apparatus provided in this embodiment further includes:

a pushing module 54, configured to push alarm information to notify a user that a direct-current electric arc fault exists in the direct current circuit.

Optionally, the direct-current electric arc detection apparatus provided in this embodiment further includes:

a determining module 55, configured to determine whether a direct-current electric arc fault result is accurate; and an updating module 56, configured to: if the direct-current electric arc fault determining result is inaccurate, update the starting arc neural network model and the burning arc neural network model based on the electrical quantity.

The apparatus embodiment is merely an example. Division into the modules in FIG. 5 is merely logical function division, and another division manner may be used during actual implementation. For example, a plurality of modules may be combined, or may be integrated into another system. Coupling between the modules may be implemented by using some interfaces. These interfaces may be electrical communication interfaces, but it is also possible that the interfaces are mechanical interfaces or interfaces in other forms. Therefore, modules described as separate components may or may not be physically separate, and may be located in one place, or may be distributed at different locations on a same device or different devices.

Figure 6:
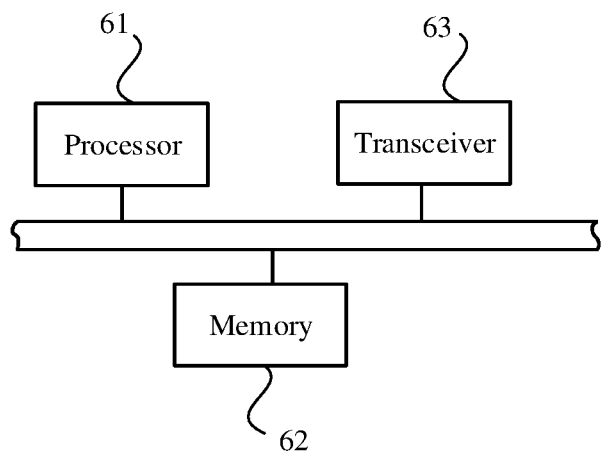
FIG. 6 is a schematic structural diagram of a terminal device according to an embodiment.

The embodiments may provide a device. FIG. 6 is a schematic structural diagram of a terminal device according to an embodiment. As shown in FIG. 6, the terminal device may include a processor 61, a memory 62, and a transceiver 63. The memory 62 stores software instructions or a computer program. The processor 61 may be a chip. The transceiver 63 implements sending and receiving of communication data by the terminal device. The processor 61 is configured to invoke the software instructions in the memory 62 to implement the foregoing direct-current electric arc detection method. For content and effects thereof, refer to the method embodiments.

Figure 7:
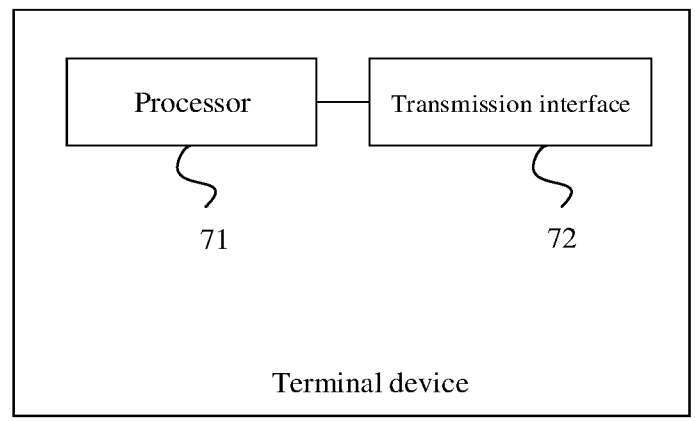
FIG. 7 is a schematic structural diagram of a terminal device according to another embodiment.

The embodiments may provide a device. FIG. 7 is a schematic structural diagram of a terminal device according to another embodiment. As shown in FIG. 7, the device provided in this embodiment includes a processor 71 and a transmission interface 72.

The transmission interface 72 is configured to obtain an electrical quantity of a direct current circuit. The processor 71 is configured to: input the electrical quantity into a burning arc neural network model to perform burning arc detection on the direct current circuit, to obtain a burning arc detection result; and if the burning arc detection result is that a burning arc is detected, determine that a direct-current electric arc fault exists in the direct current circuit.

Optionally, the electrical quantity is data obtained by performing Fourier transform and data per unit normalization processing on an original electrical quantity.

Optionally, the processor 71 is further configured to: input the electrical quantity into a starting arc neural network model to perform starting arc detection on the direct current circuit, to obtain a starting arc detection result; and if the starting arc detection result is that a starting arc is detected, input the electrical quantity into the burning arc neural network model.

Optionally, the starting arc neural network model is a neural network model obtained through training based on first training data, and the first training data includes starting arc training data and non-burning arc training data.

Optionally, the burning arc neural network model is a neural network model obtained through training based on second training data, and the second training data includes burning arc training data and the non-burning arc training data.

Optionally, the starting arc detection result is a fractional value indicating existence of a starting arc in the direct current circuit, and the processor 71 is configured to:
if the starting arc detection result is greater than a first threshold, determine that the starting arc detection result is that a starting arc is detected.

Optionally, the processor 71 is further configured to: if the starting arc detection result is less than or equal to a first threshold, continue to input the electrical quantity into the starting arc neural network model until it is determined that a starting arc exists in the direct current circuit.

Optionally, the burning arc detection result is a fractional value indicating existence of a burning arc in the direct current circuit, and the processor 71 is further configured to:
if the burning arc detection result is greater than a second threshold, determine that the burning arc detection result is that a burning arc is detected.

Optionally, the processor 71 is further configured to:
if the burning arc detection result is less than or equal to a second threshold, determine whether duration from a time at which a starting arc is detected to a current time is less than preset duration; and if the duration is less than the preset duration, continue to input the electrical quantity into the burning arc neural network model until it is determined whether a direct-current electric arc fault exists in the direct current circuit.

Optionally, the processor 71 is further configured to push alarm information to notify a user that a direct-current electric arc fault exists in the direct current circuit.

Optionally, the processor 71 is further configured to: determine whether a direct-current electric arc fault result is accurate; and if the direct-current electric arc fault determining result is inaccurate, update the starting arc neural network model and the burning arc neural network model based on the electrical quantity.

Figure 8:
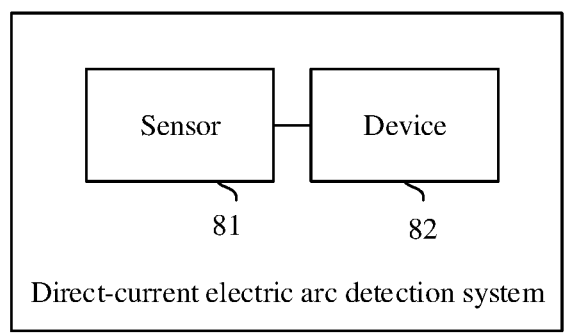
FIG. 8 is a schematic structural diagram of a direct-current electric arc detection system according to an embodiment.

The embodiments may provide a system. FIG. 8 is a schematic structural diagram of a direct-current electric arc detection system according to an embodiment. As shown in FIG. 8, the system provided in this embodiment includes a sensor 81 and the device 82 provided in the foregoing embodiment. The sensor 81 is configured to collect an electrical quantity of a direct current circuit.

An embodiment provides a non-transitory computer-readable storage medium that is configured to store instructions. When the instructions are run on a computer or a processor, the computer or the processor is enabled to perform the direct-current electric arc detection method provided in the embodiments.

An embodiment provides a computer program product including instructions. When the computer program product runs on a computer or a processor, the computer or the processor is enabled to perform the direct-current electric arc detection method provided in the embodiments.

The computer-readable medium includes a computer storage medium and a communication medium, where the communication medium includes any medium that enables a computer program to be transmitted from one place to another. The storage medium may be any available medium accessible to a general-purpose or dedicated computer. For example, the storage medium is coupled to a processor, so that the processor can read information from the storage medium or write information into the storage medium. Further, the storage medium may be a component of the processor. The processor and the storage medium may be located in an ASIC. In addition, the ASIC may be located in user equipment. Additionally, the processor and the storage medium may exist as discrete components in a communication device.

Persons of ordinary skill in the art may understand that all or some of the steps of the method embodiments may be implemented by a program instructing relevant hardware. The program may be stored in a computer-readable storage medium. When the program is executed, the steps of the method embodiments are performed. The foregoing storage medium includes any medium that can store program code, for example, a ROM, a RAM, a magnetic disk, or an optical disc.

Finally, it should be noted that the foregoing embodiments are merely intended for describing the solutions. Although this application is described in detail with reference to the foregoing embodiments, persons of ordinary skill in the art should understand that they may still make modifications to the solutions described in the foregoing embodiments or make equivalent replacements to some or all features thereof, without departing from the scope of the solutions of the embodiments.

What is claimed is:

1. A direct-current electric arc detection method comprising:
obtaining, in real time, a plurality of electrical quantities for a plurality of direct current circuits, each respective electrical quantity measured from a respective direct current circuit, wherein each of the plurality of direct current circuits is dispersed in space, said obtaining of the plurality of electrical quantities based on at least a first sensor disposed at a line junction associated with the respective direct current circuit and a second sensor disposed along an insulated line of the respective direct current circuit;
for each respective electrical quantity and direct current circuit:
inputting the electrical quantity into a burning arc neural network model to perform burning arc detection on the direct current circuit, to obtain a burning arc detection result;
inputting the electrical quantity into a non-burning-arc neural network model to perform detection of at least one other type of electrical arc on the direct current circuit, to obtain a non-burning-arc detection result;
when the non-burning-arc detection result is above a first threshold, detecting that a direct-current electric arc fault exists in the direct current circuit; or
when the burning arc detection result is above a second threshold, detecting that the direct-current electric arc fault exists in the direct current circuit;

tracking a duration from a start of a detection to a current time and comparing the duration to a preset duration, and, based on a comparison of the duration to the present duration, performing only one of:
  inputting a further electrical quantity into the burning arc neural network model and performing burning arc detection on the further electrical quantity, and
  inputting the further electrical quantity into the non-burning-arc neural network model and performing non-burning arc detection on the further electrical quantity;
upon determination that the start of the detection to the current time is less than the preset duration, pushing alarm information to notify a user that the direct-current electric arc fault exists in the direct current circuit, and prompting the user to trigger at least one mitigation measure; and
receiving an instruction to trigger the at least one mitigation measure from the user and implementing the at least one mitigation measure.

2. The direct-current electric arc detection method according to claim 1, wherein the electrical quantity is data obtained by performing a Fourier transform and data per unit normalization processing on an original electrical quantity.

3. The direct-current electric arc detection method according to claim 2, wherein, before inputting the electrical quantity into the burning arc neural network model, the method further comprises:
  inputting the electrical quantity into a starting arc neural network model to perform starting arc detection on the direct current circuit, to obtain a starting arc detection result; and
  when the starting arc detection result is that a starting arc exists in the direct current circuit, inputting the electrical quantity into the burning arc neural network model.

4. The direct-current electric arc detection method according to claim 3, wherein the starting arc neural network model is a neural network model obtained through training based on first training data, and the first training data comprises starting arc training data and non-burning arc training data.

5. The direct-current electric arc detection method according to claim 4, wherein the burning arc neural network model is a neural network model obtained through training based on second training data, and the second training data comprises burning arc training data and the non-burning arc training data.

6. The direct-current electric arc detection method according to claim 5, wherein the starting arc detection result is a fractional value indicating existence of the starting arc in the direct current circuit, and the direct-current electric arc detection method further comprises:
  when the starting arc detection result is greater than the first threshold, detecting the starting arc.

7. The direct-current electric arc detection method according to claim 6, further comprising:
  when the starting arc detection result is less than or equal to the first threshold, continuing to input the electrical quantity into the starting arc neural network model until the starting arc occurs in the direct current circuit.

8. The direct-current electric arc detection method according to claim 7, wherein the burning arc detection result is a fractional value indicating existence of a burning arc in the direct current circuit, and the direct-current electric arc detection method further comprises:
  when the burning arc detection result is greater than the second threshold, detecting the burning arc.

9. The direct-current electric arc detection method according to claim 8, further comprising:
  when the burning arc detection result is less than or equal to the second threshold, and the duration from a time at which the starting arc is less than the preset duration, continuing to input the electrical quantity into the burning arc neural network model until a direct-current electric arc fault occurs in the direct current circuit.

10. The direct-current electric arc detection method according to claim 3, further comprising:
  when the direct-current electric arc fault determining result is inaccurate, updating the starting arc neural network model and the burning arc neural network model based on the electrical quantity.

11. A device comprising:
a processor; and
a transmission interface, wherein the transmission interface is configured to obtain, in real time, an electrical quantity of a direct current circuit in a plurality of direct current circuits, said electrical quantity measured from the direct current circuit, said transmission interface comprising a connection to each of a plurality of sensors for each of the plurality of direct current circuits including at least, for each respective direct current circuit, a first sensor disposed at a line junction associated with the respective direct current circuit and a second sensor disposed along an insulated line of the respective direct current circuit, and the processor is configured to, for each respective direct current circuit in the plurality of direct current circuits:
input the electrical quantity into a burning arc neural network model to perform burning arc detection on the direct current circuit,
input the electrical quantity into a non-burning-arc neural network model to perform detection of at least one other type of electrical arc on the direct current circuit,
obtain a burning arc detection result and a non-burning-arc detection result, and,
when the non-burning-arc detection result is above a first threshold or
when the burning arc detection result is above a second threshold, determine that a direct-current electric arc fault occurs in the direct current circuit, and
track a duration from a start of a detection to a current time and compare the duration to a preset duration, and, based on a comparison of the duration to the present duration, perform only one of:
inputting a further electrical quantity into the burning arc neural network model and performing burning arc detection on the further electrical quantity, and
inputting the further electrical quantity into the non-burning-arc neural network model and performing non-burning arc detection on the further electrical quantity.

12. The device according to claim 11, wherein the electrical quantity is data obtained by performing a Fourier transform and data per unit normalization processing on an original electrical quantity.

13. The device according to claim 12, wherein the processor is further configured to
  input the electrical quantity into a starting arc neural network model to perform starting arc detection on the direct current circuit, to obtain a starting arc detection result, and,
  after the starting arc detection result is that a starting arc is detected, input the electrical quantity into the burning arc neural network model.

14. The device according to claim 13, wherein the starting arc neural network model is a neural network model obtained through training based on first training data, and the first training data comprises starting arc training data and non-burning arc training data.

15. The device according to claim 14, wherein the burning arc neural network model is a neural network model obtained through training based on second training data, and the second training data comprises burning arc training data and the non-burning arc training data.

16. The device according to claim 15, wherein the starting arc detection result is a fractional value indicating existence of the starting arc in the direct current circuit, and the processor is further configured to, when the starting arc detection result is greater than the first threshold, detect the starting arc.

17. The device according to claim 16, wherein the processor is further configured to, when the starting arc detection result is less than or equal to the first threshold, continue to input the electrical quantity into the starting arc neural network model until the starting arc exists in the direct current circuit.

18. The device according to claim 17, wherein the burning arc detection result is a fractional value indicating existence of a burning arc in the direct current circuit, and the processor is further configured to, when the burning arc detection result is greater than the second threshold, detect the burning arc.

19. The device according to claim 18, wherein the processor is further configured to, when the burning arc detection result is less than or equal to the second threshold, and the duration from a time at which the starting arc is detected to a current time is less than a preset duration, continue to input the electrical quantity into the burning arc neural network model until a direct-current electric arc fault occurs in the direct current circuit.

* * * * *